J. INGELLS.
EXTENSION TABLE SLIDE.
APPLICATION FILED MAY 6, 1914.
1,130,167. Patented Mar. 2, 1915.
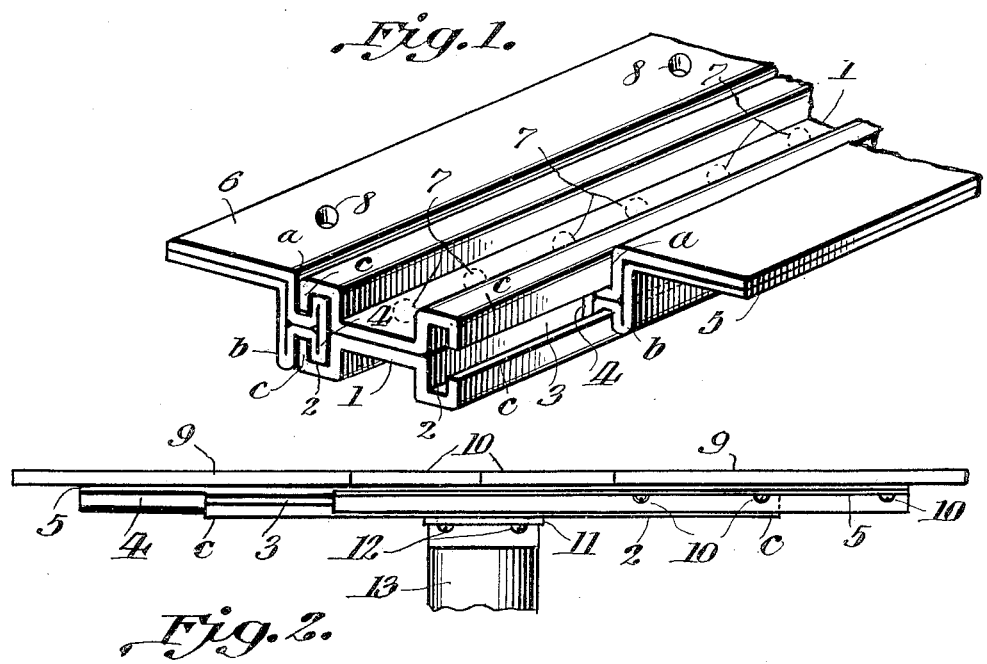
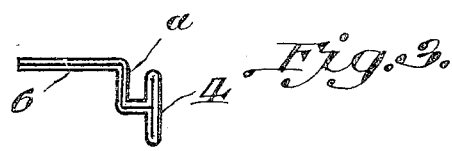

UNITED STATES PATENT OFFICE.

JAMES INGELLS, OF MUSKEGON, MICHIGAN.

EXTENSION-TABLE SLIDE.

1,130,167.

Specification of Letters Patent.

Patented Mar. 2, 1915.

Application filed May 6, 1914. Serial No. 836,815.

*To all whom it may concern:*

Be it known that I, JAMES INGELLS, a citizen of the United States, residing at Muskegon, in the county of Muskegon and State of Michigan, have invented certain new and useful Improvements in Extension-Table Slides, of which the following is a specification.

My invention relates to improvements in slides for use in extension tables, and like articles, and its objects are: first, to provide a table slide that will not be materially affected by changes in the weather; second, to provide a set of slides with which a bearing is provided the entire length of the slides; and, third, to provide a set of table slides that may be readily made upon a punch press. I attain these objects by the construction and assemblage of parts shown in the accompanying drawing, in which—

Figure 1 is a perspective of a set of slides assembled. Fig. 2 is an elevation of a table top with my slides in place. Fig. 3 is a modified form of one of the movable wings of the slide. Fig. 4 is another form of same.

Similar numerals and letters refer to similar parts throughout the several views.

In the construction of these slides I use thin sheet metal. The center, or permanent slide is made up of two pieces stamped out to form the central planes 1 1 and the sets of grooved wings c c, and the central planes are made integral, or secured together by means of so called, "spot welding", as indicated by the dotted outlines at 7 7 in Fig. 1. By this means I am able to form two exactly similar T grooves 2, 3, one each side, or edge of the slide in which the ribs 4 of the side slides 5 and 6 will slide freely. The slides 5 and 6 are made of thin sheet metal folded and secured together, as indicated in Figs. 1 and 3, so as to give the greatest possible amount of strength with the least possible amount of metal used. The side wall a of the side slides should be a trifle longer, or, rather, wider than the walls c on the central or permanent slide 1 so the slides 5 and 6 may be firmly screwed to the ends of the table and still slide freely and with no friction whatever between the table top and the permanent slide.

8 8 indicates holes through the flanges of the side slides for the passage of screws with which to secure the slides firmly to the table tops 9 9 as indicated at 10 10 in Fig. 2, and the permanent slide, 1, 2, c is secured to the cross piece 11 on the pedestal 13, as indicated at 12, so the slides 5 and 6 may be drawn in opposite directions to extend the top of the table, while the slide 1, 2, c will remain stationary on the pedestal.

In Fig. 1 I have shown the side slides, 5 and 6, with downwardly extending wings b b by means of which a groove is formed for the lower wings, c c of the permanent slide, but I find the construction shown in Fig. 3, where the wings b b are dispensed with, an absolutely satisfactory form of construction, and in many instances much more desirable as being much easier to form, requiring less material, hence less weight, and, also, requiring much less expensive dies for forming them, than is required to form the slides shown in Fig. 1.

In Fig. 2 I have shown two center leaves, 10, in place for the purpose of showing the table extended to more plainly indicate the relative positions of the several slides, especially when the table is extended.

What I claim as new, and desire to secure by Letters Patent of the United States, is:—

1. A set of table slides made up of a center slide having two pieces of sheet metal connected face to face horizontally, with grooves so formed in each edge of each sheet of metal as to open toward each other and form an outwardly opening T shaped groove at each edge of the slide, outside slides each made of two pieces of metal secured together horizontally and offset to form T shaped tongues that will slide freely in the grooves in the edges of the center slide.

2. A set of table slides made up of a center slide having two pieces of sheet metal connected face to face horizontally and having a groove formed in each edge of each sheet of metal to open toward each other and form a T shaped groove in each edge of the center slide, outside slides formed of two sheets of metal folded together and the surfaces secured, said folded metal bent to form an L shaped slide with a T shaped tongue set off from the outside surface of one of the surfaces of one wing of the L in position so the surface of the other wing of the L will extend above the surface of the center slide, the T shaped wings on the outer slides arranged to slide freely in the grooves in the inner slide.

3. A set of table slides made up of a center slide composed of two sheets of thin sheet metal, each having a square inwardly opening channel formed the whole length at each edge and arranged to register to form a T shaped outwardly opening groove in each edge of the said center slide, said two pieces spot welded together horizontally, and two outside slides each made of thin sheet metal folded surface to surface and bent longitudinally to L form, one fold of said L on each outside slide offset to form a T shaped tongue arranged to slide freely in the T shaped grooves in the edges of the center slide, and the other wing of said L made to extend above the plane of the center slide and secured to opposite ends of the table.

4. In an extension table slide, one slide made up as of two pieces of sheet metal each having a groove at the edge and secured together so said grooves will open toward each other and form a T shaped groove opening at the edge of the slide, and one slide made up as of two pieces of sheet metal having a bead formed on the edge of each, and secured together face to face forming a T shaped tongue that will slide freely in the T shaped groove in the other slide.

Signed at Muskegon, Michigan, April 28 1914.

JAMES INGELLS.

In presence of—
 OSCAR BERG,
 GENEVIEVE BERG.

Copies of this patent may be obtained for five cents each, by addressing the "Commissioner of Patents, Washington, D. C."